United States Patent
Willers et al.

(10) Patent No.: US 11,608,901 B2
(45) Date of Patent: Mar. 21, 2023

(54) VALVE ARRANGEMENT AND SWITCHING VALVE FOR REGULATING A MASS FLOW

(71) Applicant: OTTO EGELHOF GmbH & Co. KG, Fellbach (DE)

(72) Inventors: Eike Willers, Stuttgart (DE); Andreas Auweder, Vaihingen (DE); Markus Lang-Belz, Fellbach (DE)

(73) Assignee: OTTO EGELHOF GmbH & Co. KG, Fellbach (DE)

( * ) Notice: Subject to any disclaimer, the term of this patent is extended or adjusted under 35 U.S.C. 154(b) by 0 days.

(21) Appl. No.: 17/180,066

(22) Filed: Feb. 19, 2021

(65) Prior Publication Data

US 2021/0301928 A1    Sep. 30, 2021

(30) Foreign Application Priority Data

Mar. 30, 2020  (DE) .......................... 102020108762.4

(51) Int. Cl.
| | |
|---|---|
| *F16K 1/36* | (2006.01) |
| *F16K 1/20* | (2006.01) |
| *F16K 5/14* | (2006.01) |

(52) U.S. Cl.
CPC ................ *F16K 1/36* (2013.01); *F16K 1/205* (2013.01); *F16K 5/14* (2013.01)

(58) Field of Classification Search
CPC . F16K 1/443; F16K 1/42; F16K 1/205; F16K 1/36; F16K 1/46; F16K 1/00;
(Continued)

(56) References Cited

U.S. PATENT DOCUMENTS 2,414,908 A * 1/1947 Smith ........................ F16K 1/46
                                                                251/333
2,629,580 A * 2/1953 Schultis .................... F16K 1/02
                                                                137/454.6
(Continued)

FOREIGN PATENT DOCUMENTS

| DE | 19917756 A1 | 1/2000 |
|---|---|---|
| DE | 102010039127 A1 | 2/2012 |

(Continued)

OTHER PUBLICATIONS

European Search Report dated Aug. 8, 2021 in Corresponding European Application No. 21156476.

*Primary Examiner* — Mary E Mcmanmon
*Assistant Examiner* — Andrew J Rost
(74) *Attorney, Agent, or Firm* — Renner, Otto, Boisselle & Sklar, LLP

(57) ABSTRACT

A valve arrangement for a switching valve and to a switching valve for regulating a mass flow in a refrigerating circuit or a heating circuit, including a valve housing, which includes a feed opening and a discharge opening, including a valve piston, which includes a valve-closing member, which buts against a through-hole between the feed opening and the discharge opening in a closed position on a valve seat and closes the through-hole, wherein the valve seat includes a stop surface and a sealing surface which are oriented so as to be adjacent to one another, the valve-closing member includes a supporting surface and a gasket surface which are oriented so as to be adjacent to one another, an elastic sealing element is provided on the valve seat or the valve-closing member, on which sealing element the sealing surface or gasket surface is formed, a sealing projection is provided on the sealing surface or the gasket surface and is oriented towards the opposite gasket surface or sealing surface, the supporting surface of the valve- (Continued)

Figure 1:
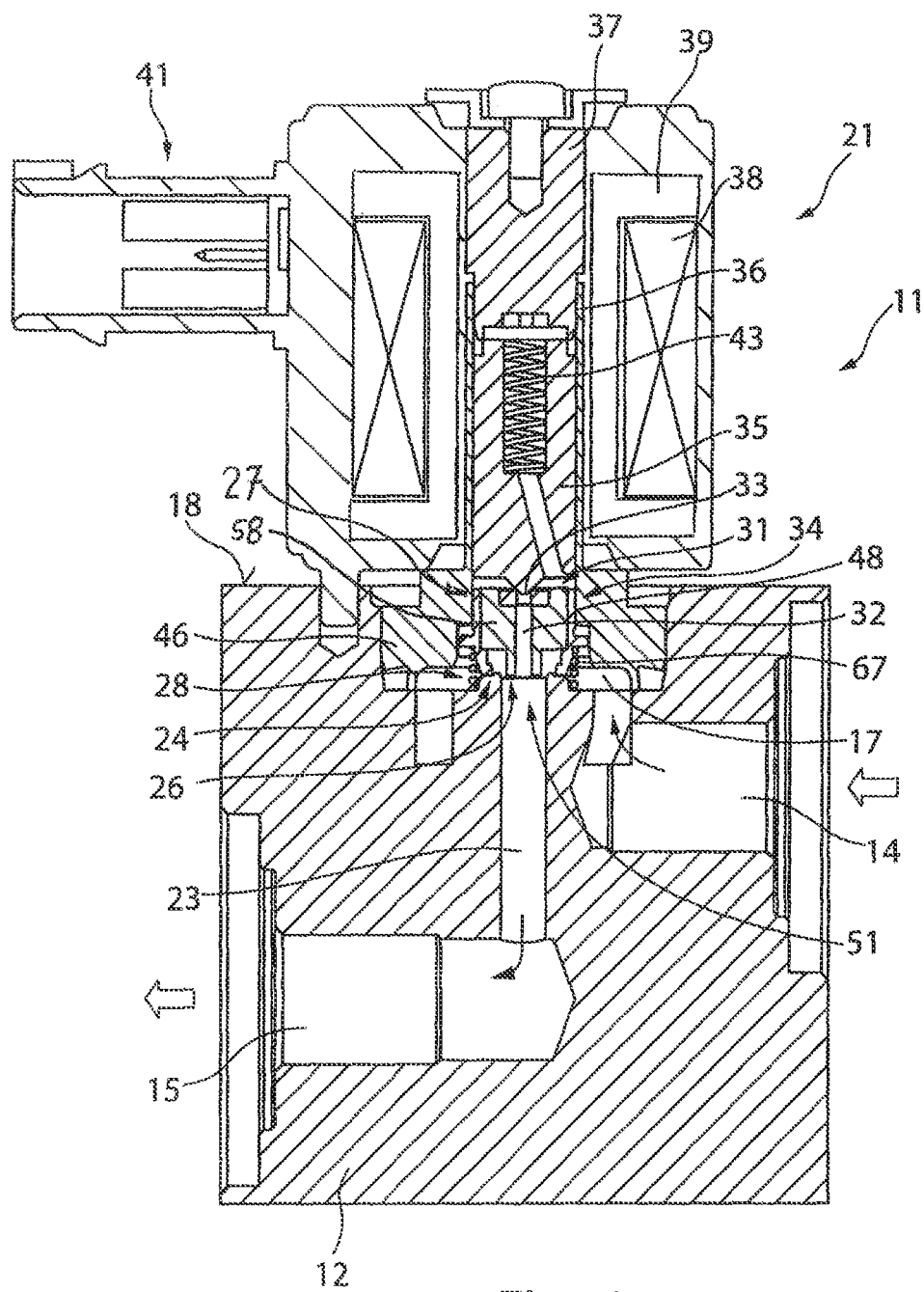

closing member and the stop surface of the valve seat but against one another in the closed position and form a travel limitation between the valve-closing member and the valve seat, and the sealing projection is at least partially pressed into the sealing element.

18 Claims, 6 Drawing Sheets

(58) Field of Classification Search
CPC .. F16K 31/408; F16K 31/0693; F16K 31/406; F16K 5/14; F16K 15/18; F16K 15/063
See application file for complete search history.

(56) References Cited

U.S. PATENT DOCUMENTS

| | | | | |
|---|---|---|---|---|
| 2,880,750 | A * | 4/1959 | Amison, Jr. | F16K 1/36 137/469 |
| 3,811,470 | A * | 5/1974 | Schaefer | F16K 15/063 137/515.7 |
| 4,228,987 | A * | 10/1980 | Potter | F16K 1/34 251/210 |
| 5,044,604 | A * | 9/1991 | Topham | F16K 25/04 251/368 |
| 6,039,071 | A * | 3/2000 | Tomita | F16K 1/42 137/596.17 |
| 9,897,221 | B2 * | 2/2018 | Terashima | F02M 21/0266 |
| 10,072,760 | B2 * | 9/2018 | Kajio | F16K 1/36 |
| 2003/0132409 | A1 * | 7/2003 | Birkelund | F16K 51/02 251/30.04 |
| 2006/0071193 | A1 | 4/2006 | Kobayashi et al. | |
| 2009/0065073 | A1 * | 3/2009 | Davis | F16K 31/1262 137/505.36 |

FOREIGN PATENT DOCUMENTS

| | | |
|---|---|---|
| DE | 10201307060 | 1/2015 |
| KR | 20110003420 U | 4/2011 |
| WO | 2018/219527 A1 | 12/2018 |
| WO | 2018/228746 A1 | 12/2018 |

* cited by examiner

VALVE ARRANGEMENT AND SWITCHING VALVE FOR REGULATING A MASS FLOW

This application claims priority of German Application No. 10 2020 108 762.4, filed Mar. 30, 2020, which is hereby incorporated herein by reference.

The invention relates to a valve arrangement and to a switching valve comprising a valve arrangement of this kind for regulating a mass flow in a refrigerating circuit or a heating circuit.

DE 10 2013 107 060 A1 discloses a switching valve for regulating a mass flow in a refrigerating circuit or a heating circuit. This switching valve comprises a valve housing, which comprises a feed opening and a discharge opening. A valve-closing member is provided on a valve piston, which member in a closed position buts against a valve seat arranged between the feed opening and the discharge opening. A pilot valve is provided opposite the valve-closing member, which pilot valve comprises a pilot hole in the valve seat which opens into the through-hole and passes through the valve piston. For actuating the valve piston, a travel-generating device is provided, which has an actuatable tappet which receives a closing body that closes the pilot hole and can be transferred into an open position that unblocks the pilot hole with the closing body.

Furthermore, a bypass channel is formed in the valve housing between the feed opening and the pilot hole. In a switching valve, a sealing element arranged on the valve-closing member buts against the valve seat, wherein a closing force from a closing spring acting on the closing body is completely transferred to the sealing element for the sealing arrangement.

The object of the invention is to propose a valve arrangement and a switching valve having such a valve arrangement which allows for an increased service life, in particular also when using different media, while maintaining the sealing effect.

The object is achieved by a valve arrangement in which the valve seat comprises a stop surface and a sealing surface which are oriented so as to be adjacent to one another, and the valve-closing member comprises a supporting surface and a gasket surface arranged so as to be adjacent thereto, wherein an elastic sealing element is provided on the valve seat or valve-closing member, on which sealing element the sealing surface or gasket surface is formed, and the sealing surface or the gasket surface comprises a sealing projection, which is oriented towards the opposite gasket surface or sealing surface, and wherein the supporting surface of the valve-closing member and the stop surface of the valve seat but against one another in a closed position of the valve-closing member in the valve seat and form a travel limitation between the valve-closing member and the valve seat, wherein the sealing projection is at least partially pressed into the sealing element. This valve arrangement makes it possible for force on the elastic sealing element to be relieved in the closed position of the valve-closing member relative to the valve seat, since the supporting surface and the stop surface tightly abut one another in the closed position such that the closing force of the valve-closing member does not exert its full effect on the seal. At the same time, owing to the design of the sealing projection, sufficient sealing is provided by a form fit between the sealing projection and the opposite surface, i.e. the sealing surface or the stop surface. This form-fitting sealing is possible when the sealing projection is provided on the elastic sealing element and abuts an opposite sealing surface or gasket surface, such that the projecting volume of the sealing projection is pressed into the sealing element. This form-fitting sealing is also provided when the sealing projection is provided on the stop surface or supporting surface and is at least partially pressed into the elastic sealing element such that a volume in the circumference of the sealing projection is displaced in the elastic sealing element by the sealing projection, which is rigidly formed opposite the elastic sealing element, on the stop surface or the supporting surface.

This valve arrangement can preferably be used for an NC (normally closed) switching valve and also for an NO (normally open) switching valve. In an NC switching valve, the valve-closing member is arranged in a closed position relative to the valve seat in a starting position. In an NO switching valve, the valve-closing member is raised relative to the valve seat in a starting position.

It is preferably provided that the valve piston of the valve arrangement comprises a valve body, to which the sealing element with a sealing sleeve is fastened relative to the valve body. As a result, the sealing element can be retained relative to the valve body in a simple manner. In addition, different geometries of the sealing element can be used in a simple manner.

In a valve piston which is preferably constructed from the valve body and the sealing sleeve fastened thereto, an end face of the sealing sleeve can form the supporting surface, which is provided for limiting the travel of the valve-closing member in the closed position relative to the valve seat. Alternatively, it may be provided that the supporting surface is provided on an end face of the valve body pointing towards the valve seat.

Advantageously, a receiving volume for the elastic sealing element is formed between the valve body and the sealing sleeve, wherein the sealing element inserted into the receiving volume is smaller in volume than the receiving space. As a result, the receiving volume is not completely filled by the sealing element. This has the advantage that, if the sealing element swells up or if the sealing element increases in volume, for example due to temperature and/or pressure, the sealing element can expand in the receiving volume and the sealing surface or gasket surface remains unaffected.

Advantageously, it is provided that the sealing sleeve, which is arranged on the valve body and surrounds the valve body on the outside at least in part, comprises a radially inwardly projecting annular collar on an end face, which collar acts on an outer circumference of the sealing element and fixes it in the receiving space relative to the valve body. Alternatively, the sealing sleeve, which can be inserted into the valve body, can comprise a radially outwardly projecting annular collar on an end face, which collar acts on an inner circumference of the sealing element and fixes it in the receiving space relative to the valve body. The first alternative is preferably provided for smaller diameters of the through-hole in the valves. The second alternative is preferably provided for larger through-holes in the valve, in which larger sealing diameters are preferably also required. In both cases, it is made possible for the sealing element to be mounted relative to the valve body together with the sealing sleeve in a simple manner.

It is advantageously provided that the sealing element is retained in a direction, preferably in an axial direction of the valve body, in a form-fitting and/or force-locked manner, in particular in a tightly compressed manner, by the annular collar of the sealing sleeve and a free space remains in the receiving space in another direction, preferably in a radial direction. As a result, with regard to the opening and closing movement for the sealing arrangement, defined ratios are provided in the closed position of the valve-closing member relative to the valve seat, whereas the sealing element can expand in the radial direction if necessary.

It is advantageously provided that the sealing projection is formed as a circumferential bead which is provided on the sealing element or on the sealing sleeve or valve-closing member or on the valve seat. A radially circumferential bead of this kind is simple to produce in terms of geometry and can provide sufficient sealing.

According to an alternative embodiment of the valve arrangement, the valve body of the valve piston and the sealing element are produced as a two-component injection-molded part. This configuration makes it possible for a valve piston for a valve arrangement to be produced in one process. In this embodiment, additional mounting of a sealing sleeve to fix the sealing element to the valve body can be omitted. Furthermore, alternatively to the embodiment of the valve body and the sealing element in the form of a two-component injection-molded part, the sealing element can be connected to the valve piston by an adhesive bond and/or a press fit. By means of this adhesive bond and/or press fit, a part of the sealing element can also engage behind a portion of the valve piston for improved fixing.

According to a first alternative embodiment of the valve arrangement, it is provided that the sealing projection is arranged on the valve seat and projects in the stroke direction of the valve-closing member relative to the stop surface of the valve seat. This sealing projection on the sealing surface and the stop surface are advantageously made of one material and are assigned to a through-opening on which the valve seat is formed.

Alternatively, it may be provided that the sealing projection is provided on the elastic sealing element, which is preferably arranged on the valve-closing member and points towards a sealing surface on the valve seat, which surface adjoins the stop surface. In this case, the sealing surface and the stop surface can be in one plane.

It is advantageously provided that the sealing projection preferably projects relative to the adjacent stop surface or supporting surface by between 0.05 mm and 0.5 mm.

In the advantageous embodiment of the valve arrangement in which the valve seat comprises the stop surface and, adjacently thereto, the sealing surface comprising the sealing projection and the elastic sealing element is provided on the valve-closing member so as to be opposite the sealing projection, the sealing projection can displace a volume of from 1% to 30% of the sealing element in the sealing element when the valve-closing member is arranged in a closed position relative to the valve seat. This allows for sufficient sealing or elastic deformation of the sealing element.

Furthermore, it is preferably provided that the sealing projection provided on the sealing surface of the valve seat is provided for a through-opening having a diameter of from 1 mm to 40 mm.

Another preferred configuration of the valve arrangement provides that a pilot valve is provided opposite the valve-closing member of the valve piston. This pilot valve comprises a pilot hole in the valve body of the valve piston which passes through the valve body and opens into the through-hole. Furthermore, a travel-generating device is provided, which has an actuatable tappet which receives a closing body that closes the pilot hole and can be transferred into an open position that unblocks the pilot hole with the closing body. A bypass channel is preferably formed between the feed opening and the pilot hole. This valve arrangement may thus not only be provided in a switching valve, but also in a valve comprising a pilot valve.

It is preferably provided that the sealing sleeve is pressed onto or glued to the valve body or bonded to said valve body at least in part after positioning the sealing sleeve relative to the valve body. This allows for simple mounting of the sealing sleeve relative to the valve body while integrating the sealing element.

According to a preferred embodiment, it is provided that the sealing sleeve fastened to the valve body comprises a radially outwardly directed shoulder, on which a return element acts which is guided between the valve seat and the valve piston. This shoulder is in particular provided when the valve piston is designed as a pilot valve, meaning that an opening movement of the valve piston relative to the valve seat is limited.

It is preferably provided that the bypass channel is formed by a bypass channel between an outer circumference of the sealing sleeve arranged on the valve body and a guide bushing of the tappet by a clearance between the sealing sleeve and the guide bushing, or that a flattened region or a longitudinal groove is formed at least on the outer circumference of the sealing sleeve. As a result, it is possible to guide the valve piston in the guide bushing of the tappet in a structurally simple manner and, at the same time, for the function of the pilot valve, to form a bypass channel through which the medium can reach the pilot-valve hole.

Another preferred configuration of the valve piston provides that the sealing sleeve and the valve body are pressed together in a region which is within the radially outwardly projecting shoulder. By means of this radially outer circumferential shoulder, an increased force can be achieved in order to act on the valve body in the region which extends over the width of the shoulder when viewed in the axial direction. In another region, a small annular gap can be formed between the sealing sleeve and the valve body in the axial direction, which extends in the opposite direction to the valve-closing member. It is preferably provided that knurling, in particular longitudinal knurling, is provided on the outer circumference of the valve body. This allows for pressing together the sealing sleeve and the valve body to be simplified.

Furthermore, it is preferably provided that the valve body comprises a pilot valve seat that is oriented towards the pilot hole and is made of a plastics material, in particular of Teflon, which is preferably pressed into the valve body in the form of a ring. As a result, it is also possible for the leakage rate to be reduced. In addition, switching noise can be minimized.

Furthermore, the object of the invention is achieved by a switching valve for regulating a mass flow in a refrigerating circuit or a heating circuit, which comprises a valve housing having a feed opening and a discharge opening, and comprises a valve piston, which comprises a valve-closing member, which points towards the discharge opening and buts against a valve seat arranged on a through-hole between the feed opening and the discharge opening in a closed position, wherein the switching valve comprises a valve arrangement according to any of the preceding embodiments.

Figure 2:
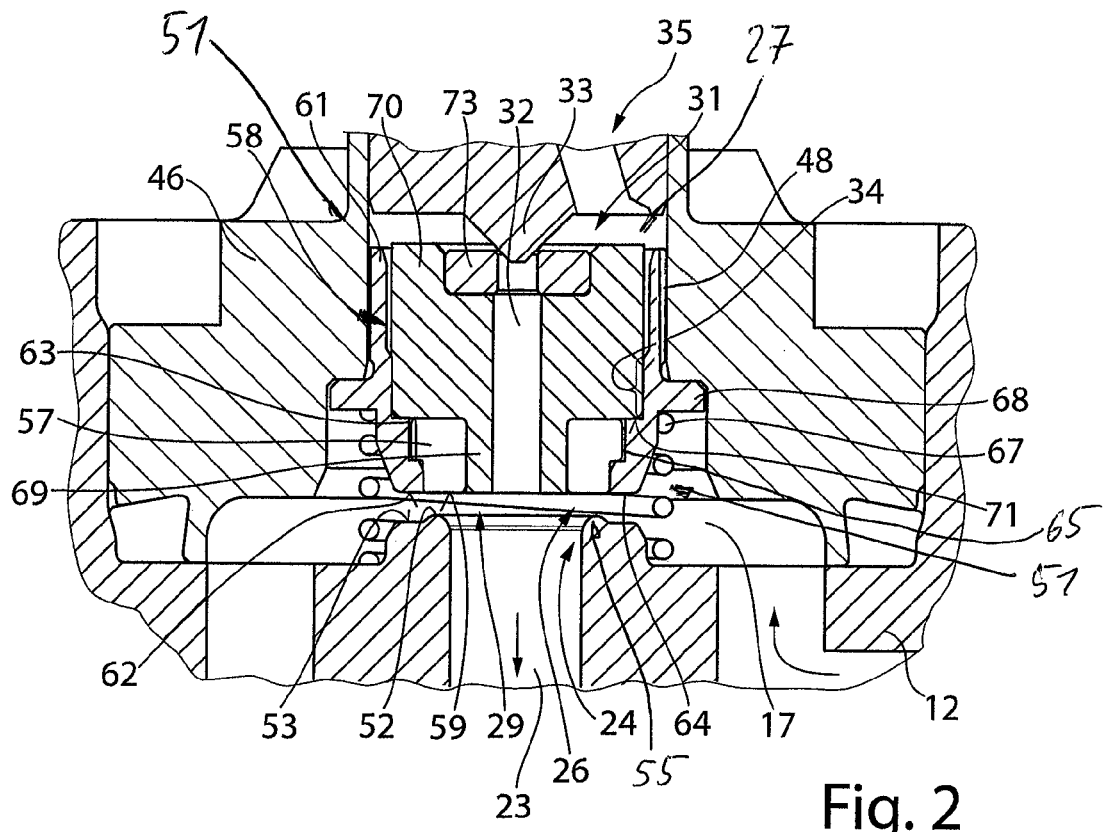
Figure 3:
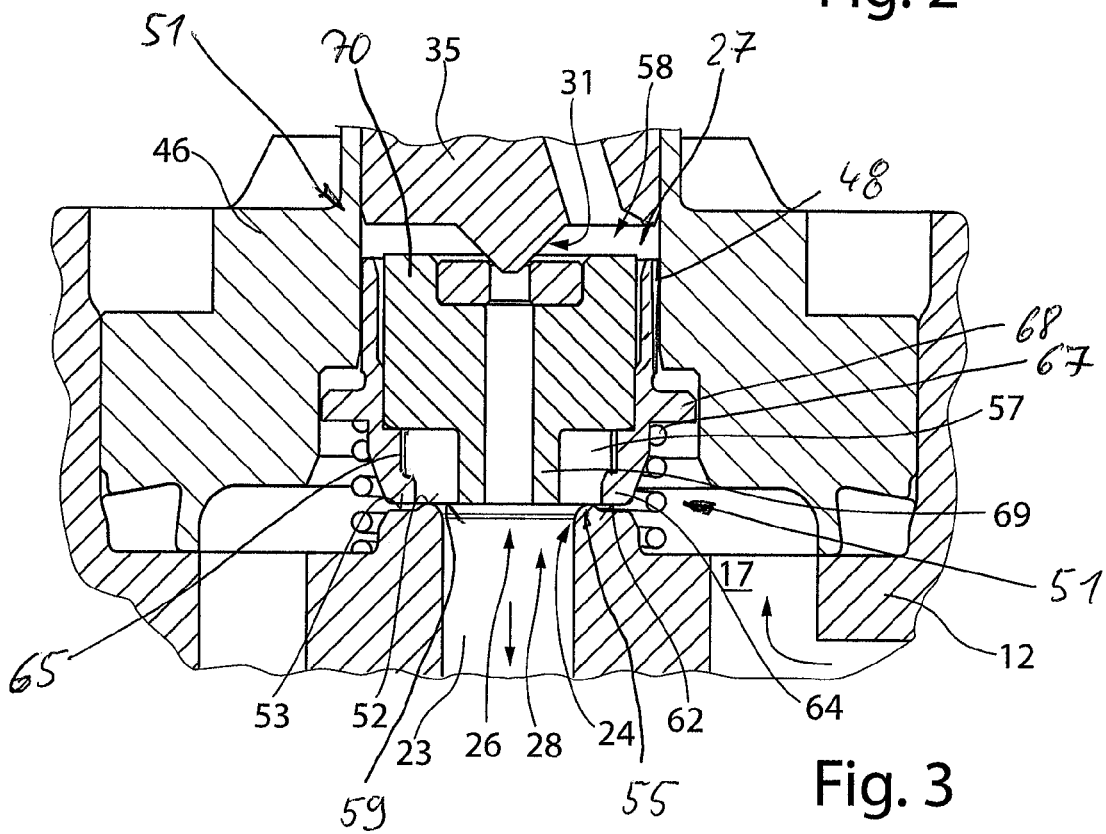
Figure 4:
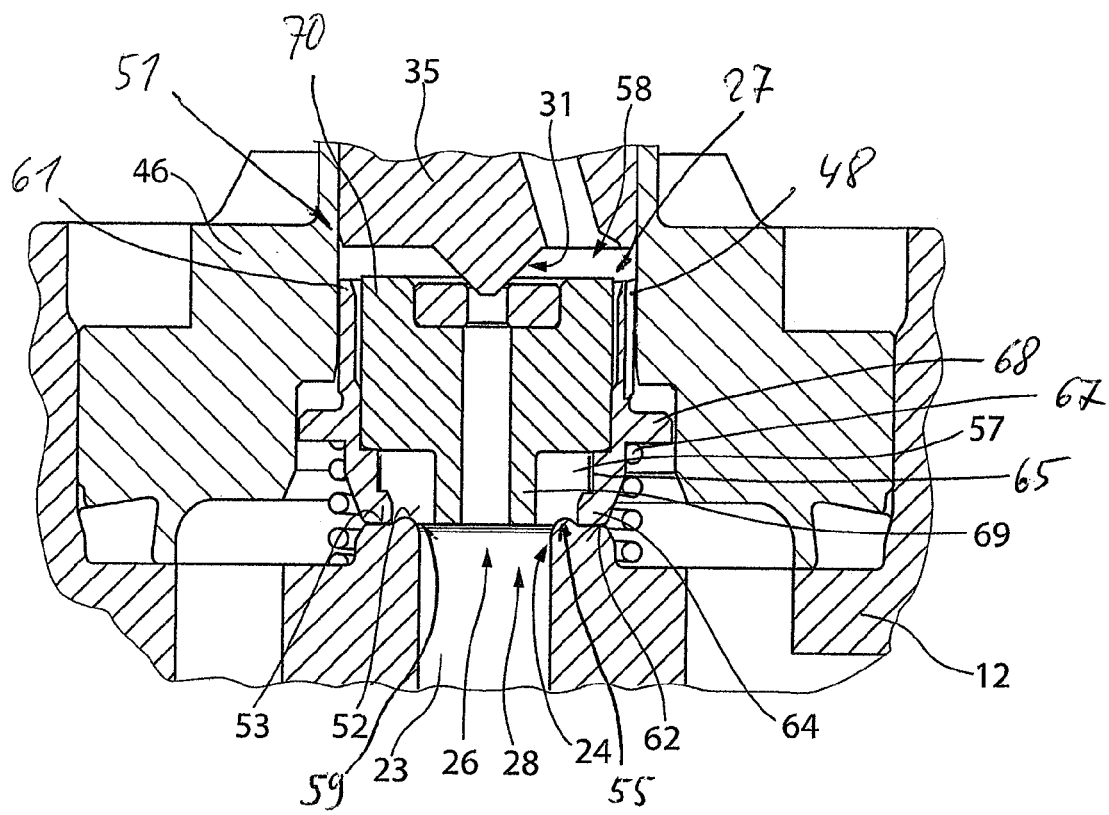
Figure 5:
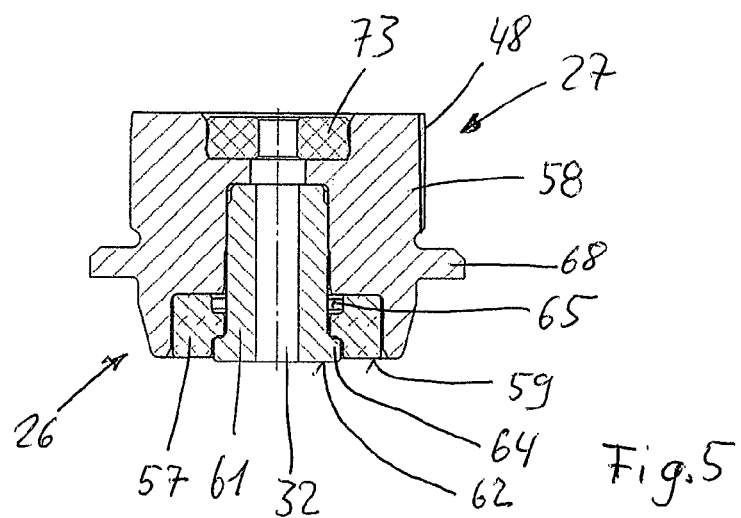
Figure 6:
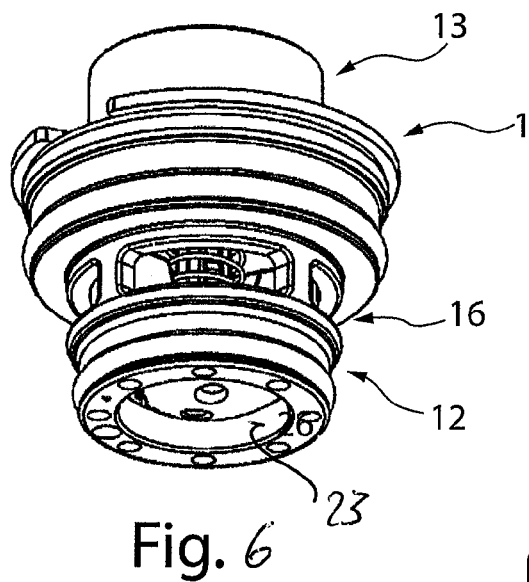
Figure 7:
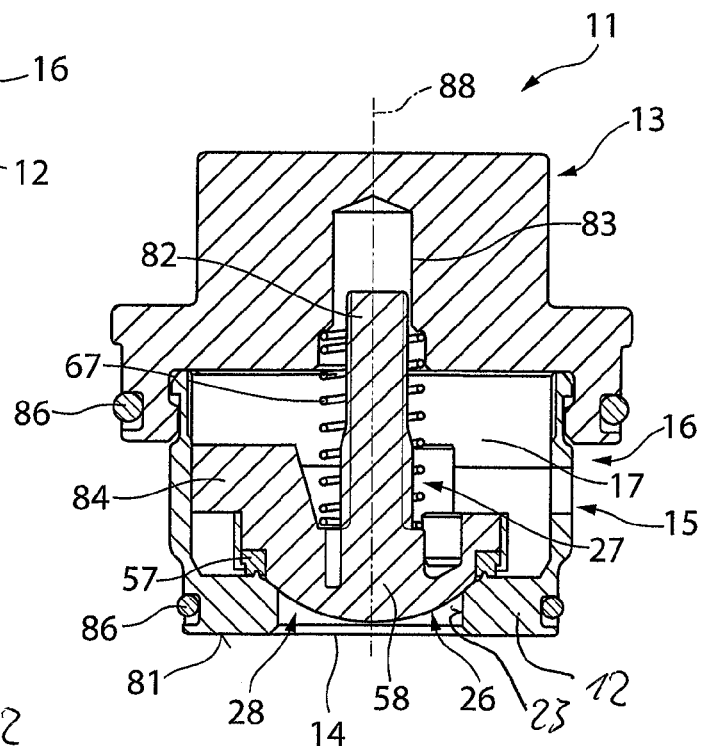
Figure 8:
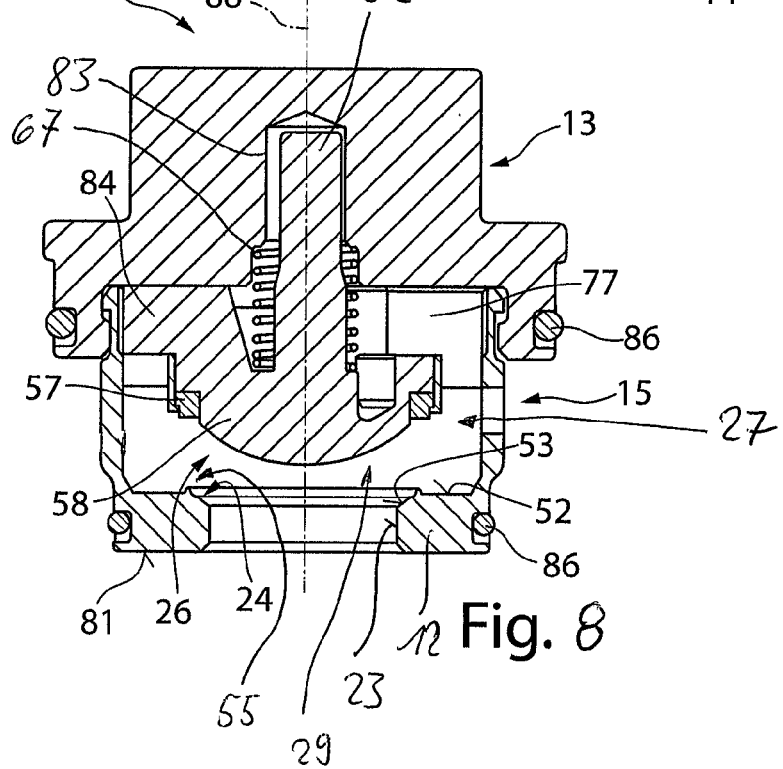
Figure 9:
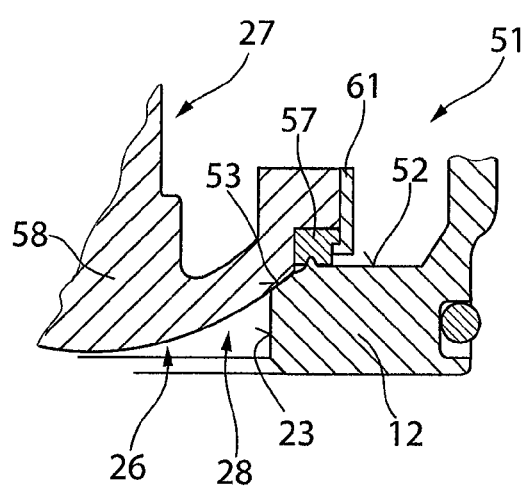
Figure 10:
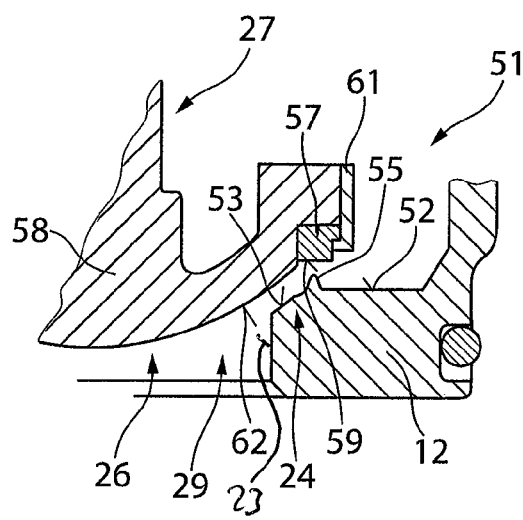
Figure 11:
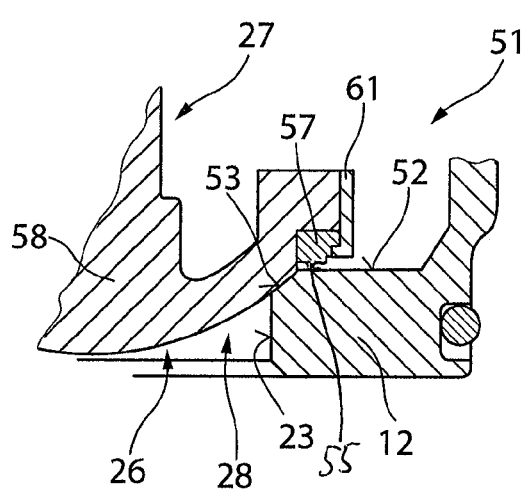
Figure 12:
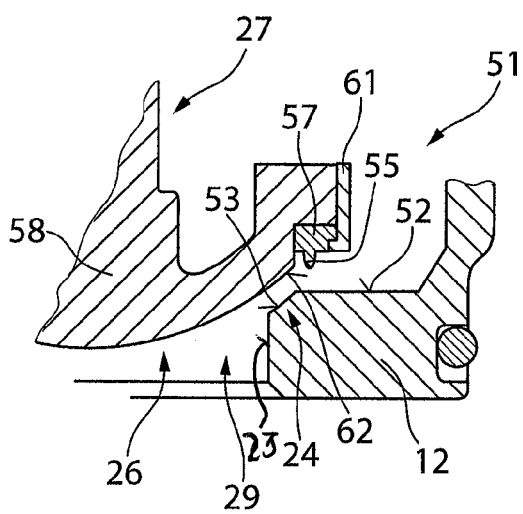
Figure 13:
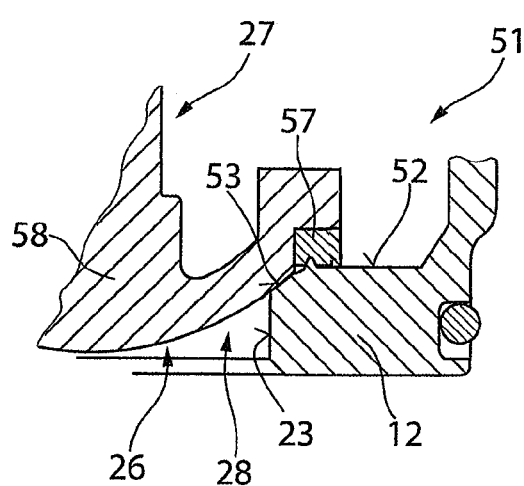
Figure 14:
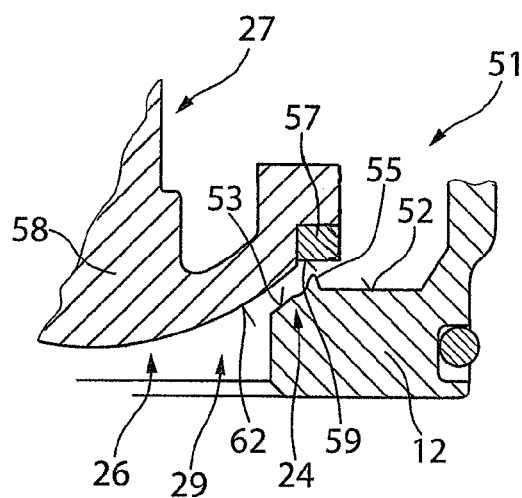
Figure 15:
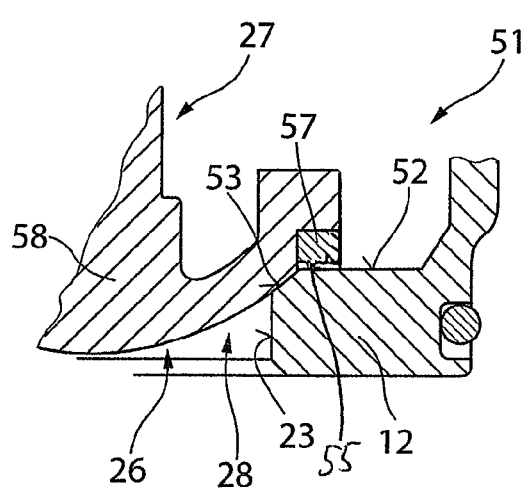
Figure 16:
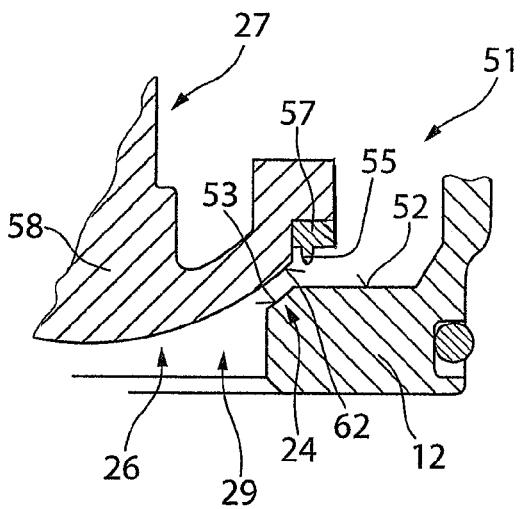

The invention as well as advantageous embodiments and developments thereof are described and explained in greater detail in the following with reference to the examples shown in the drawings. The features found in the description and the drawings can be implemented according to the invention either individually or together in any combination. In the drawings:

FIG. 1 is a schematic sectional view of a switching valve,

FIG. 2 is a schematically enlarged view of a valve arrangement of the switching valve according to FIG. 1 in an open position, FIG. 3 is a schematically enlarged view of the valve arrangement according to FIG. 2 in a closing phase, FIG. 4 is a schematically enlarged view of the valve arrangement according to FIG. 2 in a closed position, FIG. 5 is a schematically enlarged view of a valve piston according to an alternative embodiment to FIGS. 1 to 4, FIG. 6 is a perspective view of an alternative embodiment of the switching valve to FIG. 1, FIG. 7 is a schematic sectional view of the switching valve according to FIG. 6 in a closed position, FIG. 8 is a schematic sectional view of the switching valve according to FIG. 6 in an open position, FIG. 9 is a schematically enlarged sectional view of the valve arrangement according to FIG. 7 in the closed position, FIG. 10 is a schematically enlarged sectional view of the valve arrangement according to FIG. 8 in an open position, FIG. 11 is a schematically enlarged sectional view of an alternative embodiment of the valve arrangement to FIG. 9 in a closed position, FIG. 12 is a schematic sectional view of the valve arrangement according to FIG. 11 in an open position, FIG. 13 is a schematically enlarged sectional view of an alternative embodiment of the valve arrangement according to FIG. 9 in a closed position, FIG. 14 is a schematically enlarged sectional view of the valve arrangement according to FIG. 13 in an open position, FIG. 15 is a schematically enlarged sectional view of an alternative embodiment of the valve arrangement to FIG. 13 in a closed position, and FIG. 16 is a schematically enlarged sectional view of the valve arrangement according to FIG. 15 in an open position.

FIG. 1 is a schematic sectional view of a first embodiment of a switching valve 11 according to the invention. This switching valve 11 comprises a valve housing 12 comprising a feed opening 14 for a mass flow, in particular a coolant, as well as a discharge opening 15 and a chamber 17 that connects the feed opening 14 and the discharge opening 15, or a coolant channel. The feed opening 14 and the discharge opening 15 each comprise connections for supply lines or other components.

The chamber 17 in the valve housing 12 is open towards a housing side 18 to which a travel-generating device 21 is detachably fastened. The chamber 17 transitions into a through-hole 23, which is surrounded by a valve seat 24, which a valve-closing member 26 of a valve piston 27 bust against in a closed position 28.

At its end opposite the valve-closing member 26, the valve piston 27 comprises a pilot hole 32, which can be closed by a closing body 33. The pilot hole 32 and the closing body 33 form a pilot valve 31. This closing body 33 is rigidly arranged on a tappet 35, which can be moved up and down or back and forth by the travel-generating device 21.

According to this embodiment, the travel-generating device 21 comprises an armature tube 36, to which a core 37 is assigned. A coil 38 surrounds the armature tube 36, which is in turn integrated in a yoke 39. The travel-generating device can be actuated and held by electrical connection lines 41.

The tappet 35 is mounted so as to be movable relative to the armature tube 36 while interposing a return spring 43 towards the core 37, i.e., when energizing the coil 38, the tappet 35 is drawn into the armature tube 36 counter to the spring force of the return spring 43 and, when the coil 38 is switched off, the return spring 43 transfers the tappet 35 into a closing movement and arranges the tappet 35 in a closed position, as shown in FIG. 1. In this case, the closing body 33 engages in the pilot hole 32 in the valve piston 27. The valve-closing member 26 closes the through-hole 23 and buts against the valve seat 24. The valve piston 27 is preferably guided in a guide bushing 46 that can be inserted into the valve housing 12. Alternatively, the valve piston 27 can also be guided directly on a wall portion of the chamber 17 that is open towards a housing side 18. A bypass channel 48 is provided between this wall portion of the guide bushing 46 or chamber 17 and the valve piston 27, meaning that a connection is established between the access opening 14 and the pilot valve 31. After raising the closing body 33 out of the pilot hole 32, the mass flow can flow through the pilot hole 32 into the through-hole 23, since the pilot hole 32 extends through the valve piston 27 in its entirety as far as the valve-closing member 26. Subsequently, the valve piston 27 lifts off from the valve seat 24 with the assistance of the spring element 67.

The valve 11 shown in FIG. 1 is what is known as an NC valve (normally closed valve), i.e., when a coil 38 is not energized, the valve 11 is closed and a passage between the feed opening 14 and the discharge opening 15 is blocked. In a valve 11 of this kind, a monostable travel-generating device 21 is used, for example, which only maintains a position of the tappet 35 for as long as the coil 38 is energized.

FIG. 2 is a schematically enlarged view of a valve arrangement 51. This valve arrangement 51 is provided in the switching valve 11 according to FIG. 1, for example. The valve arrangement 51 comprises the valve seat 24 and the valve-closing member 26. The valve seat 24 comprises a sealing surface 52 and a stop surface 53. This sealing surface 52 and the stop surface 53 are preferably adjacent to one another or transition into one another. The sealing surface 52 preferably surrounds the through-hole 23. The sealing surface 53 extends outside the stop surface 52. A sealing projection 55 is preferably formed on the sealing surface 52. For example, this sealing projection 55 is bead-shaped, semi-circular or arc-segment-shaped. This sealing projection 55 projects in the axial direction towards the valve-closing member 26 opposite the stop surface 53. The sealing surface 52 and the stop surface 53 are preferably made of the same material, and in particular the sealing surface 52 and the stop surface 53 are integrally molded directly on the valve housing 12. Alternatively, it may also be provided that the valve seat 24 is formed as an insertion element, which can be fastened to the valve housing 12 so as to face towards the through-hole 23. The valve seat 24 may also consist of and be composed of separate elements, wherein one element comprises the sealing surface 52 and another element comprises the stop surface 53. Just one of the elements, i.e. the sealing surface 52 or the stop surface 53, can also be designed to be separate and can form the valve seat 24 together with the other elements that are arranged directly on the valve housing 12.

For example, the through-hole 23 has a diameter of from 1 mm to 40 mm. The sealing projection 55 may project relative to the adjacent stop surface 53 by 0.05 mm to 0.5 mm.

The valve piston 27 comprises the valve-closing member 26 in the direction of the valve seat 24. The valve-closing member 26 comprises a supporting surface 62 and a gasket surface 59. They are preferably adjacent to one another.

According to the embodiment, the valve-closing member 26 is formed by a sealing element 57 and a sealing sleeve 61. The sealing element 57 is retained so as to be fixed relative to the valve body 58 of the valve piston 27 by means of the sealing sleeve 61. The sealing sleeve 61 comprises the supporting surface 62 at the end face. The gasket surface 59 is provided so as to be adjacent thereto. This gasket surface 59 is preferably radially within the supporting surface 62. The sealing surface 59 is preferably provided on the sealing element 57 at the end face so as to point towards the valve seat.

The sealing element 57 is positioned in a receiving space 63 formed between the sealing sleeve 61 and the valve body 58. The sealing sleeve 61 comprises an annular collar 64, which projects radially inwards, at the end face. The sealing element 57 is preferably stepped, so as to have two cross sections of different widths. As a result, the sealing element 57 can be fixed by the smaller cross section at the end face relative to the valve body 58 by the annular collar 64. Furthermore, the annular collar 64 fixes the larger cross section of the sealing element 57 relative to the valve body 58 in the axial direction. A free space 65 is formed in the receiving space 63 between the sealing element 57 and the sealing sleeve 61, such that the sealing element 57 having the larger annular cross section can expand radially in this region. The valve-closing member 26 preferably comprises, in one plane, the sealing surface 59 of the sealing element 57 and the supporting surface 62 on the sealing sleeve 61.

The valve-closing member 26 is shown in an open position relative to the valve seat 24. The opening movement of the valve-closing member 26 is assisted by the spring element 67, which acts in the direction of the tappet 35.

The maximum open position of the valve-closing member 26 is limited by the sealing sleeve 61. A radially outwardly pointing shoulder 68 of the sealing sleeve 61 can but against the guide bushing 46. On the opposite side, the spring element 67 acts on the shoulder 68 and is also guided in part by an outer face of the annular collar 64.

The bypass channel 48 is formed between an outer circumference of the sealing sleeve 61 and the guide bushing 46. In this case, it may be provided that longitudinal grooves are provided on the outer circumference of the sealing sleeve 61 and/or that longitudinal grooves are provided in the guide bushing 46. Alternatively, the sealing sleeve 61 may comprise one or more flattened regions on the outer circumference. This has the advantage that radial guidance of the sealing sleeve 61 in the guide bushing 46 is retained but sufficient free space is still provided for the medium to flow from the chamber 17 to the pilot hole 32.

The sealing sleeve 61 is preferably pressed onto the valve body 58. The sealing element 57 is preferably placed onto a sleeve-like portion 69 of the valve body 58. The valve body 58 is then inserted into the sleeve portion 70 of the sealing sleeve 61 until the annular surface 71 of the valve body 58 buts against a complementary annular surface in the sealing sleeve 61. This axially orients the sealing sleeve 61 relative to the valve body 58. At the same time, a planar end-face configuration of the valve-closing member 26 in the direction of the valve seat 24 can be provided thereby. In addition, the annular collar 64 can connect the sealing element 57 to the valve body 58 in a force-locked manner in the axial direction. A press fit is formed between the valve body 58 and the sealing sleeve 61 in a region in which the shoulder 68 is formed. The sleeve portion 70 that is attached thereto can still be formed with a small gap from the valve body 58.

The pilot valve 31 is formed on the valve body 58 so as to be opposite the valve-closing member 26. A pilot-valve seat 73, which is inserted into, in particular pressed into, the valve body 58, is preferably provided. This preferably consists of polytetrafluoroethylene. The tappet 35 closes the pilot hole 32 in the open position of the valve-closing member 26.

The energizing of the travel-generating device 21 is switched off in order to move the valve-closing member 26 from the open position into the closed position. The return element 43 pushes the tappet 35 and thus the valve-closing member 26 in the direction of the valve seat 24.

FIG. 3 shows a closing phase of the valve piston 27. In this closing phase, the interruption of the flow passing through the through-hole 23 begins. In the closing phase shown, the gasket surface 59 of the sealing element 57 buts against the sealing surface 52 of the valve-closing member 24, in particular by means of the sealing projection 55.

FIG. 4 is a schematically enlarged sectional view of the valve arrangement 51 in the closed position of the valve-closing member 26 relative to the valve seat 24. The closing movement of the valve piston 27 onto the valve seat 24 is limited by the supporting surface 62, which buts against the stop surface 53 of the valve seat 24. As a result, a defined form fit is produced with a predetermined force between the gasket surface 62 and the sealing surface 52 of the valve seat 24. The sealing projection 55 preferably displaces a volume in the sealing element 57 of from 1% to 30%, for example. This is sufficient for a sealing arrangement. At the same time, the sealing element is prevented from being squashed or from yielding, or from being permanently damaged.

In the closed position 28 of the valve-closing member 26 relative to the valve seat 24, a force-locked fit is provided between the stop surface 53 of the valve seat 24 and the supporting surface 62 of the valve-closing member 26 or the sealing sleeve 61. A form fit is formed between the sealing surface 52 of the valve seat 24 and the gasket surface 59 of the sealing element 57.

Alternatively, it may be provided that the sealing projection 55 is formed on the sealing element 57 and the sealing surface 52 of the valve seat 24 is formed as a planar surface, in the same way as the stop surface 53, and is preferably formed in the same plane.

Furthermore, it may alternatively be provided that the sealing element 57 is provided on the valve seat 24, such that the arrangement shown in FIGS. 2 to 4 is reversed.

FIG. 5 is a schematically enlarged sectional view of an alternative embodiment of the valve-closing member 26 to FIGS. 1 to 4. In the embodiment according to FIGS. 1 to 4, the sealing sleeve 61 surrounds an outer circumference of the valve piston 27 at least in part and fixes the sealing element 57 relative to the valve piston 27.

In the embodiment according to FIG. 5, the sealing sleeve 61 can likewise be fastened to the valve piston 27 in a force-locked and/or form-fitting manner. In this case, the sealing sleeve 61 is inserted into the valve piston 27 in the region of the pilot hole 32. The sealing sleeve 61 comprises an inner through-hole, which forms part of the pilot hole 32. A radially outwardly directed annular collar 64 is provided on the end face of the sealing sleeve 61. The sealing element 57 is retained so as to be fixed relative to the valve piston 27, in particular relative to the valve body 58, by means of this annular collar 64. In this case, a free space 65 is preferably formed between the sealing element 57 and the sealing sleeve 61. This may be a circumferential channel or gap. A gasket surface 59 of the sealing element 57 is recessed relative to the supporting surface 62 of the sealing sleeve 61. As a result, by analogy with the above-described embodiment of the valve arrangement 51 according to FIGS. 1 to 4, travel limitation of the valve-closing member 26 relative to the valve seat 24 is provided.

In this embodiment according to FIG. 5, a bypass channel 48 may be provided in the form of a flattened region or depression on an outer circumference of the valve body 58. The shoulder 68 is preferably provided in one piece on the valve body 58. This shoulder may also be formed by a separate, pressed-on part. Furthermore, a pilot valve seat 73 may likewise be fitted to the valve body 58.

Moreover, the above configurations and alternatives according to FIGS. 1 to 4 apply to these embodiments according to FIG. 5.

FIG. 6 is a perspective view of a switching valve 11 in the form of a non-return valve. This non-return valve 11 comprises a valve housing 12 and a main housing 13. The valve housing 12 is connected to the main housing 13 by an interface 16. As a result, the valve housing 14 can be detached from the main housing 13.

The structure of the switching valve 11 is clear from the sectional view according to FIG. 7. This sectional view shows the switching valve 11 in a closed position 28. FIG. 8 is a schematic sectional view of the switching valve 11 in an open position 29.

The valve housing 12 is advantageously formed in one piece. This valve housing consists of plastics material, for example, and preferably has a cage-like construction. A feed opening 14 is provided on an end face 81 of the valve housing 12. One or more discharge openings 15 are provided in a radial circumferential wall of the valve housing 12. The through-hole 23 is arranged therebetween. The valve piston 27 comprising the valve-closing member 26 is provided on the valve housing 12. The valve seat 24 surrounds the through-hole 23. The valve piston 27 comprises at least one rod-shaped guide portion 82, which is guided in a hole portion 83 of the main housing 13. In addition, guide fins 84 can be provided on the valve piston 27. These guide fins 84 comprise radially outwardly pointing guide portions which act on an inner face of the valve housing 12 and guide the valve piston 27 in the radial direction during an opening and closing movement of the valve piston 27 relative to the valve seat 24. A spring element 67, by means of which the valve piston 27 is retained in a closed position 28, is provided between the valve piston 27 and the main housing 13. In this closed position 28, the valve-closing member 26 buts against the valve seat 24 and closes the through-opening 23. Sealing elements 86, in particular O-ring seals, may be provided on an outer circumference of the main housing 13 and/or the valve housing 12. As a result, the switching valve 11 can be positioned in a sealing manner in a connection point between a feed opening 14 and a discharge opening 15.

In this switching valve 11, it is for example provided that a medium is fed in the axial direction along the longitudinal axis of the switching valve 11 and the medium is discharged in the radial direction via the discharge openings 15.

FIG. 9 is a schematically enlarged sectional view of the valve-closing member 26 and the valve seat 24 in a closed position 28. FIG. 10 shows the valve arrangement 51 according to FIG. 9 in an open position 29.

The structure of the valve arrangement 51 according to FIGS. 9 and 10 corresponds to the structure, arrangement and embodiments that are described in FIGS. 2 to 4.

The only difference is that, in the valve seat 24, the stop surface 53 is assigned to the through-hole 23 and the sealing surface 52 is provided radially outside the stop surface 53. Alternatively, a reversal may also be provided by analogy with the valve arrangement 51 according to FIGS. 2 to 4.

FIGS. 11 and 12 show an alternative configuration of the valve arrangement 51 to FIGS. 9 and 10. In this alternative embodiment, it is provided that the sealing projection 55 is provided on the sealing element 57. The sealing surface 52 can be formed as a plane as a result.

The embodiments according to FIGS. 9 to 12 also show that the stop surface 53 can also be oriented towards the sealing surface 52 on the valve seat 24 such that they are at an obtuse angle to one another. In such a switching valve 11 according to FIG. 6, it may also be provided that the sealing surface 52 and the stop surface 53 of the valve seat 24 are in a common plane, in particular a common radial plane. The supporting surface 52 and the gasket surface 59 of the valve-closing member 26 are designed to be complementary to one another.

FIG. 13 is a schematically enlarged sectional view of an alternative embodiment of the valve-closing member 26 to FIG. 9 in the closed position 28. FIG. 14 shows the alternative embodiment of the valve-closing member 26 according to FIG. 13 in an open position 29.

This alternative embodiment of the valve-closing member 26 differs from the embodiment according to FIG. 9 in that a sealing sleeve 61 is not provided. Instead, the valve-closing member 26 consisting of the valve body 58 and the sealing element 57 is formed as a single component, which is produced as a two-component injection-molded part. The valve body 58 is formed by the hard component. The soft component is used to produce and injection-mold the sealing element 57 onto the valve body 58. In addition, the comments made with regard to FIGS. 9 and 10 are applicable.

FIG. 15 shows an alternative embodiment of the valve-closing member 26 to FIG. 13 in the closed position 28. FIG. 16 is a schematically enlarged view of the valve-closing member 26 according to FIG. 15 in an open position 29 relative to the valve seat 24. In this embodiment too, the sealing element 57 and the valve body 58 are formed as a two-component injection-molded part. The embodiment according to FIGS. 15 and 16 differs from the embodiment according to FIGS. 13 and 14 in that the projection 55 is integrally molded on the sealing element 57. In the configurations according to FIGS. 13 and 14, the projection 55 is provided so as to be adjacent to the stop surface 53 on the valve seat 24.

LIST OF REFERENCE NUMBERS

List of reference numbers 11. switching valve
12. valve housing
13. basic housing
14. feed opening
15. discharge opening
16. interface
17. chamber
18. housing side
19.
20.
21. travel-generation device
22.
23. through hole
24. valve seat
25.
26. valve closing member
27. valve piston
28. closed position
29. opening position
30.

List of reference numbers 31. pilot valve
32. pilot hole
33. closing body
34. leadership
35. tappet
36. armour tube
37. core
38. coil
39. yoke
40.
41. electrical connection
42.
43. reset element
44.
45.
46. guide bushing
47.
48. bypass channel
49.
50.
51. valve arrangement
52. sealing surface
53. stop surface
54.
55. sealing projection
56.
57. sealing element
58. valve body
59. gasket surface
60.
61. sealing sleeve
62. supporting surface
63. receiving space
64. annular collar
65. free space
66.
67. spring element
68. shoulder
69. touchdown section
70. sleeve portion
71. ring face
72.
73. pilot valve seat
74.
75.
76.
77.
78.
79.
80.
81. end face
82. guide section
83. hole portion
84. guide fin
85.
86. sealing element
87.
88. longitudinal axis
89.
90.
91.
92.
93.
94.
95.
96.
97.
98.
99.
100.

The invention claimed is:

1. A valve arrangement for a switching valve for regulating a mass flow in a refrigerating circuit or a heating circuit, comprising a valve housing, which comprises a feed opening and a discharge opening, comprising a valve piston, which comprises a valve-closing member, which buts against a valve seat of a through-hole between the feed opening and the discharge opening in a closed position and closes the through-hole, wherein
   the valve seat comprises a stop surface and a sealing surface which are oriented so as to be adjacent to one another,
   the valve-closing member comprises a supporting surface and a gasket surface which are oriented so as to be adjacent to one another,
   an elastic sealing element is provided on the valve seat or the valve-closing member, on which sealing element the sealing surface or gasket surface is formed,
   a sealing projection is provided on the sealing surface or the gasket surface and is oriented towards the opposite gasket surface or sealing surface,
   the supporting surface of the valve-closing member and the stop surface of the valve seat but against one another in the closed position and form a travel limitation between the valve-closing member and the valve seat, and the sealing projection is at least partially pressed into the sealing element,
   the valve piston comprises a valve body, to which the sealing element with a sealing sleeve is fastened,
   the sealing sleeve provided on the valve body comprises a radially outwardly protruding shoulder, on which a spring is guided between the valve seat and the valve piston, wherein the radially outwardly protruding shoulder buts against an indent of a guide bushing in an open position of the valve-closing member.

2. The valve arrangement according to claim 1, wherein the supporting surface is provided on an end face of the sealing sleeve or on an end face of the valve body facing the valve seat so as to be adjacent to the sealing element.

3. The valve arrangement according to claim 1, wherein a receiving space is formed between the valve body and the sealing sleeve, and in that the sealing element arranged in the receiving space occupies a volume which is smaller than a volume of the receiving space.

4. The valve arrangement according to claim 1, wherein the sealing sleeve that surrounds the valve body on the outside at least in part comprises a radially inwardly projecting annular collar, pointing towards the valve seat, which radially inwardly projecting annular collar acts on an outer circumference of the sealing element and fixes the sealing element in a receiving space, or in that the sealing sleeve inserted in the valve body comprises a radially outwardly projecting annular collar, pointing towards the valve seat, which radially outwardly projecting annular collar acts on an inner circumference of the sealing element and fixes the sealing element in the receiving space.

5. The valve arrangement according to claim 4, wherein the sealing element is retained in an axial direction relative to the longitudinal axis of the valve piston, so as to be fixed in a form-fitting or force-locked manner by the annular collar of the sealing sleeve and is arranged in a radial direction relative to the longitudinal axis of the valve piston, with the formation of a free space in the receiving space.

6. The valve arrangement according to claim 1, wherein the sealing sleeve is pressed onto or glued to the valve body or bonded to said valve body at least in part after being placed thereon.

7. The valve arrangement according to claim 1, wherein the sealing element and the valve body are produced as a two-component injection-molded part or in that the sealing element and the valve body are interconnected by an adhesive bond and/or a press fit.

8. The valve arrangement according to claim 1, wherein when the sealing projection is arranged on the valve seat, the sealing projection projects in the stroke direction of the valve-closing member relative to the stop surface of the valve seat or wherein when the sealing projection is arranged on the sealing element, the sealing projection projects in the stroke direction of the valve-closing member relative to the supporting surface.

9. The valve arrangement according to claim 8, wherein the sealing projection projects relative to the adjacent stop surface or the adjacent supporting surface at a height of from 0.05 mm to 0.5 mm.

10. The valve arrangement according to claim 1, wherein the sealing projection is provided on the sealing surface of the valve seat and displaces a volume of from 1% to 30% of the sealing element towards the valve seat in the closed position of the valve-closing member.

11. The valve arrangement according to claim 1, wherein the sealing surface together with the sealing projection provided thereon and the stop surface are formed in one piece on the valve housing.

12. The valve arrangement according to claim 1, wherein the valve seat comprises the stop surface and the sealing surface and the sealing projection is positioned so as to adjoin the through-hole, wherein a through-opening has a diameter of from 1 mm to 30 mm.

13. The valve arrangement according to claim 1, wherein the valve piston comprises a pilot valve opposite the valve-closing member, which pilot valve comprises a pilot hole in the valve piston which opens into the through-hole and comprises a travel-generating device, which has an actuatable tappet which receives a closing body that closes the pilot hole and can be transferred into an open position that unblocks the pilot hole with the closing body and comprises a bypass channel formed between the feed opening and the pilot hole.

14. The valve arrangement according to claim 13, wherein a bypass channel is formed between an outer circumference of the sealing sleeve and the guide bushing of a tappet by a clearance or at least one flattened region formed on an outer circumference of the sealing sleeve or at least one longitudinal channel arranged on the outer circumference of the sealing sleeve or on the inner circumference of the guide bushing.

15. The valve arrangement according to claim 13, wherein the sealing sleeve and the valve body are pressed together in the region of the radially outwardly protruding shoulder and another sleeve portion of the sealing sleeve adjoining said shoulder is provided with a gap from the valve body.

16. The valve arrangement according to claim 1, wherein knurling is provided on the outer circumference of the valve body, and is provided in the region of a press fit to be produced with the sealing sleeve.

17. The valve arrangement according to claim 1, wherein the valve body comprises a pilot valve seat that is oriented towards a pilot hole and is made of a plastics material which is pressed into the valve body in the form of a ring.

18. A non-return valve for regulating a mass flow in a refrigerating circuit or a heating circuit, comprising a valve housing, which comprises a feed opening and a discharge opening, comprising a valve piston, which comprises a valve-closing member, which points towards the discharge opening, buts against a valve seat arranged on a through-hole between the feed opening and the discharge opening in a closed position and is retained in this closed position by a spring, wherein the valve seat and the valve-closing member are formed according to the valve arrangement according to claim 1.

\* \* \* \* \*